Sept. 6, 1932.     A. W. CHAPMAN     1,875,915
ADJUSTABLE SEAT MECHANISM
Filed Oct. 9, 1930
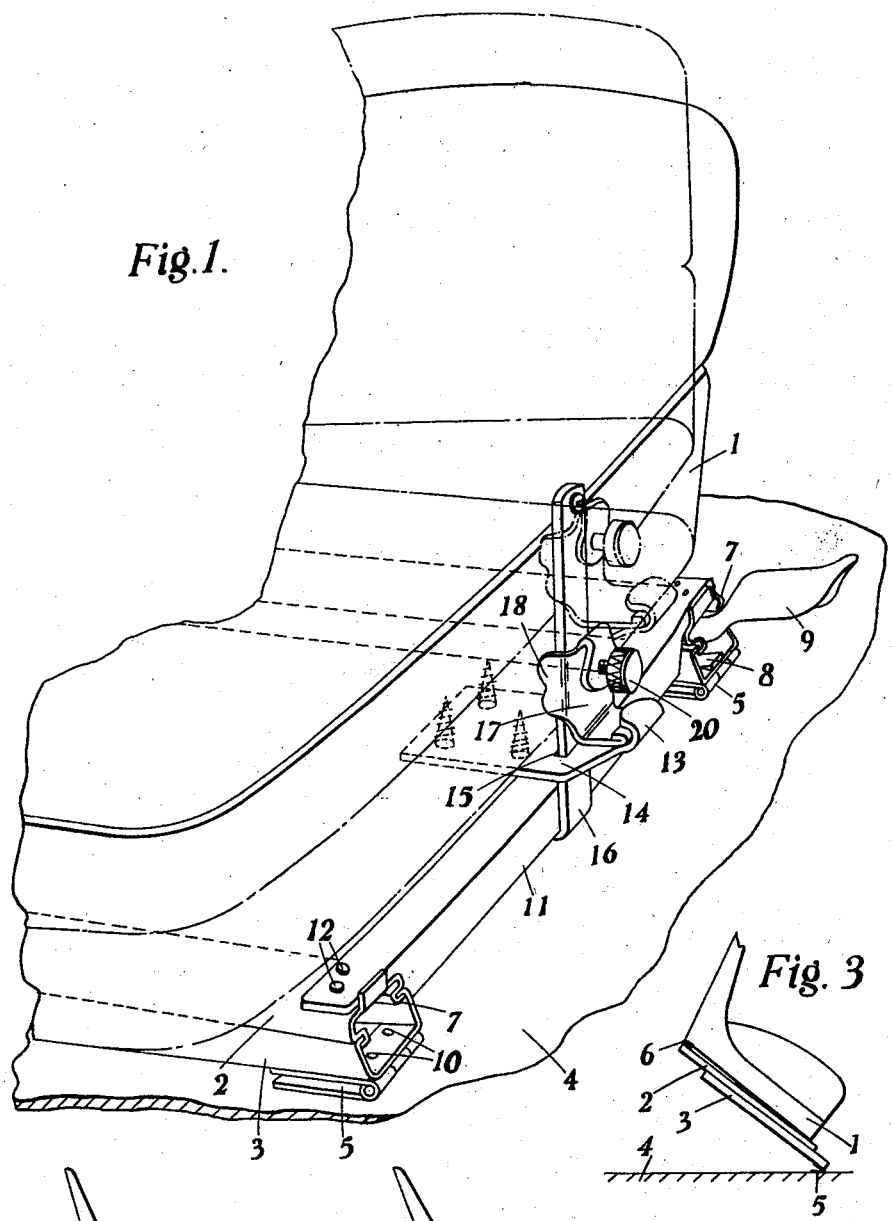
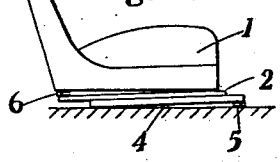
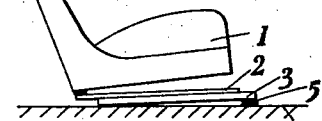
INVENTOR
Arthur William Chapman
BY
Charles H. Kisler
ATTORNEY Patented Sept. 6, 1932

1,875,915

UNITED STATES PATENT OFFICE

ARTHUR WILLIAM CHAPMAN, OF PUTNEY, LONDON, ENGLAND

ADJUSTABLE SEAT MECHANISM

Application filed October 9, 1930, Serial No. 487,383, and in Great Britain August 16, 1930.

This invention relates to adjustable seats for vehicles, chairs and the like.

An object of the invention is to provide an appliance for adjusting the rake (or tilt) of a seat.

A further object is to provide means for enabling the seat to slide upon rails, for forward or rearward adjustment, and at the same time to be capable of being tipped together with the rails upon which it slides, so as to leave a free or unobstructed floor when the seat is in the temporarily tipped position in order that a person may pass with ease behind the same.

Other objects or advantages of the invention will become apparent from the particular description which now follows.

In order to aid the description, reference will hereinafter be made to the accompanying drawing in which is illustrated a seat of an automobile having my present improvements, in conjunction with rails for providing forward and rearward adjustment.

Figure 1 is a perspective view of the front portion of the seat, the rear portion being omitted from considerations of space. Figure 2 is a small diagrammatic view of the seat, however, in side elevation. Figure 3 is a similar view showing it tipped up or tipped forwardly. Figure 4 is a like view showing the seat raked backwards at a small but often sufficient angle for comfort.

In the several views, the same reference numerals indicate the same parts of the appliance.

The seat 1 in the example taken for the purpose of illustration bears upon its underside a pair of parallel channel strips of metal 2 which are adapted to slide upon a corresponding pair of strips, constituting rails 3, which are fastened down upon the floor 4 of the automobile, the position of said strips ordinarily being longitudinal and parallel to the direction of travel of the automobile.

The bottom strips 3 are secured to the floor 4 by means of hinges 5 placed at their forward extremities. The rear extremities of the strips 3 are not secured, but they lie freely upon the floor under the weight of the strips 3 and the seat 1 bearing upon the latter, together with the added weight of the occupant of said seat. The strips 2 and the strips 3 also, if desired, may be braced together by cross stays or in any other manner to prevent strain or distortion of the same under any lateral or torsional stresses of the seat.

The top strips 2 are secured upon the undersurface of the seat 1 only at their rear extremities by hinges 6. The front of the seat rests upon the top of said strips 2 without being directly attached thereto, and can be raised therefrom a limited distance when it is desired to tilt the seat backwards in a manner to be described further herein.

Before entering upon this further description a short explanation of the working of the strips 2 and 3 will be given. Each top strip 2 being of channel formation as stated, is formed with S-shaped edges 7, the lower concavity of which embraces the inturned edge 8 of the bottom strip 3, thereby producing an interlocking slidable connection of one strip with the other, the two forming a box-like enclosure. Nevertheless, other formations of the edges of the respective strips 2 and 3 may be adopted for attaining the desired end. For instance these relative formations could be inverted, namely, the strip 3 could take the form of the strip 2, and vice versa, or any other arrangement of a similar character could be employed. The box-like enclosure between the strip 2 and the strip 3 is conveniently utilized—so far as one of the pairs is concerned—to house a locking mechanism which prevents longitudinal movement of the upper strips in relation to the lower strips, until released. In the example shown, one of the bottom strips 3 is provided with a strip 8 having a series of teeth punched up to form a rack, which, nevertheless, can alternatively be formed direct in the base of the strip 3, if preferred. A rod 9—only the free end of which is visible—is fastened at its inner end within the box-like enclosure formed by any two of the strips 2 and 3 which coact. Said rod 9 bears a tooth (not shown) which engages like a pawl against any tooth of the rack 8 which may happen to be opposite to it when the rod 9 is lowered under the action of a spring, this being its normal locking position. The rod 9 can be raised, when the seat is about to be slid, by lifting it up with the finger. A description of an alternative locking mechanism useful for this purpose is to be found in my concurrent application for a patent which was filed in the United States Patent Office on September 13, 1929, and received the Serial Number 392,305.

In the action of tipping the seat 1 from its normal position (Fig. 2) into a forwardly inclined position (Fig. 3) the interlocked strips 2 and 3 rise from the floor 4 at their rear ends, but are held down to the floor at their fore ends by the hinges 5 upon which they turn, said hinges being fastened to the floor by screws or the like and to the bottom strips 3 by rivets 10 or the like.

The foremost extremities of the two top strips 2 are interconnected by an angle iron forming a cross girder 11, riveted thereto by rivets 12 or otherwise attached.

At or about the centre of the front of the seat 1 upon the underside thereof is fastened a plate 14 so as to protrude forwardly therefrom in a horizontal or substantially horizontal direction. Said plate 14 has a slot 15 therein embracing loosely an upright bar 16, which stands up from the girder 11 to which it is sufficiently firmly secured to withstand any reasonably heavy load which may bear upon the front of the seat 1, it being necessary to state that this bar 16 has to take the whole burden of the front of the seat when the latter has been raised and is left with the seat tilted into the raked position, shown in Fig. 4 (from which, however, the bar 16 and adjacent details are omitted for the sake of clearness). The distance necessary for the front of the seat to rise through is not usually more than 4 or 5 inches at the most, and the present invention enables the front of the seat to be held locked at any intermediate height. The object is to adjust and to vary the tilt or rake of the seat for purposes of comfort, the action being instant and extraordinarily simple to operate.

An L-shaped member 17 (hereinafter called the locking cam) is slidably attached to that portion of the bar 16 which is above the plate 14, for which purpose the locking cam 17 is provided with U-shaped cheeks 18 embracing the edges of said bar 16, which is illustrated as being a flat bar of rectangular section. (It could be circular, or of any other section, that is found convenient.) The extreme forward end of the locking cam 17 is hooked over, as at 13, so that its tip overhangs the fore edge of the plate 14. When the cam 17 is slid upwards (either by pulling it from above or pushing it from below), the seat front 1 necessarily travels upwards also, because the fore edge of the plate 14 is constantly within the angle of the hook 13 and is inseparable therefrom. If now the cam 17 be locked upon the bar 16, the weight and burden of the front of the seat will be transmitted through the device which effects such lock. This is made possible in an automatic and very simple manner as follows, which explains the reason for describing the member 17 as a "locking cam". This member 17 is a sufficiently loose fit upon the bar 16 to be able to rock or tilt slightly and, though in one position it will slide easily up or down the bar 16, in its other position it will grip it frictionally after the manner of a gripping cam, due to the channels of the cheeks 18 having been forced to assume an inclination in relation to the edges of the bar 16 which they are embracing. They therefore become locked or bound against the latter when they are rocked or tilted, and such movement is brought about when the hook 13 bears down on the forward tip of the L-shaped cam 17. On the other hand, if the cam be slid upwards, carrying the hook 13 with it, the locking effect is at once broken. It is thus self-acting under downward pressure, but presents no obstacle to movement in an upward direction. It is a simple matter, therefore, to tilt the seat backwards (merely by leaning back) and to cause the front edge to rise until the desired angle of rake is attained. The sitter may then sit forward again, and the seat will remain locked in its raked position. In order, however, to prevent the seat from being tilted still further—unless so desired— a set screw 20 is provided in the vertical portion of the locking cam 17 which, when screwed home will hold the cam in its locked position upon the bar 16.

The self-locking action of the cam 17 may be further assured by its being spring-urged in a convenient manner. To release the seat 1 in order to change its position of rake, the set-screw 20 simply needs to be unscrewed and pressed backwards, which action liberates the cam 17 and the seat is thereupon free to fall to its normal position.

It is thus manifest that the present invention enables a seat to be raked to any desired angle instantly, the seat becoming then rigidly held against downward movement, and that the seat can quickly be locked against undesired upward movement.

What I claim is:

1. In an adjustable seat mechanism, a seat base pivoted at its rear, a horizontally slotted plate projecting from the seat, an upright bar standing up from a fixture and loosely surrounded by the slot in said plate so that the latter can slide freely up and down upon said bar, an L-shaped cam member also slidable upon said bar and connected by a loosely fitting hook to said plate so that downward pressure upon the plate causes the cam member to swing through an angle sufficient to cause it to grip upon the bar and create a downward resisting lock thereon, and means for releasably locking said cam member against upward movement thus preventing undesired further raking or tilting of the seat.

2. In an adjustable seat mechanism, a pair of strips constituting rails fastened to the floor or other base in parallel relationship suitably spaced apart, another pair of strips fastened in corresponding position to the underside of the seat by hinges at the rear, means upon the edges of said strips to produce slidable engagement of the first-mentioned pair of strips with the second-mentioned pair, a cross girder connecting together the fore ends of the said two upper strips, a horizontally slotted plate projecting from the seat, an upright bar standing up from said cross girder and loosely surrounded by the slot in said plate so that the latter can slide freely up and down upon said bar, an L-shaped cam member also slidable upon said bar and connected by a loosely fitting hook to said plate so that downward pressure upon the plate causes the cam member to swing through an angle sufficient to cause it to grip upon the bar and create a downward resisting lock thereon and means for releasably locking said cam member against upward movement thus preventing undesired further raking or tilting of the seat.

3. In an adjustable seat mechanism, a pair of strips constituting rails fastened by means of hinges at the front to the floor or other base in parallel relationship suitably spaced apart, another pair of strips fastened in corresponding position to the underside of the seat by hinges at the rear, means upon the edges of said strips to produce slidable engagement of the first-mentioned pair of strips with the second-mentioned pair, a cross girder connecting together the fore ends of the said two upper strips, a horizontally slotted plate projecting from the seat, an upright bar standing up from said cross girder and loosely surrounded by the slot in said plate so that the latter can slide freely up and down upon said bar, an L-shaped cam member also slidable upon said bar and connected by a loosely fitting hook to said plate so that downward pressure upon the plate causes the cam member to swing through an angle sufficient to cause it to grip upon the bar and create a downward resisting lock thereon and means for releasably locking said cam member against upward movement thus preventing undesired further raking or tilting of the seat.

In witness whereof I have signed this specification.

ARTHUR WILLIAM CHAPMAN.